(12) United States Patent
Lyons et al.

(10) Patent No.: US 8,444,903 B2
(45) Date of Patent: May 21, 2013

(54) METHOD OF FABRICATING THREE DIMENSIONAL PRINTED PART

(75) Inventors: Brett I. Lyons, Chicago, IL (US); Jens Rossfeldt, Green Valley, AZ (US); Matt Wallen, Tucson, AZ (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 12/793,868

(22) Filed: Jun. 4, 2010

(65) Prior Publication Data
US 2010/0237531 A1 Sep. 23, 2010

Related U.S. Application Data

(60) Provisional application No. 61/184,610, filed on Jun. 5, 2009.

(51) Int. Cl.
*B29C 67/00* (2006.01)

(52) U.S. Cl.
USPC ............................. 264/308; 264/113; 264/256

(58) Field of Classification Search
USPC ............. 264/112, 113, 308, 255, 256; 164/16
See application file for complete search history.

(56) References Cited

U.S. PATENT DOCUMENTS

| | | | |
|---|---|---|---|
| 3,801,334 A | 4/1974 | Dewey, Jr. | |
| 3,919,162 A | 11/1975 | Austin | |
| 4,196,011 A | 4/1980 | Koike | |
| 4,226,277 A | 10/1980 | Matalon | |
| 4,329,177 A | 5/1982 | George | |
| 4,473,526 A | 9/1984 | Buhler et al. | |
| 4,480,681 A | 11/1984 | Alexander et al. | |
| 4,504,314 A | 3/1985 | Barker et al. | |
| 4,683,118 A | 7/1987 | Hayashi et al. | |
| 4,750,540 A | 6/1988 | Boenisch | |
| 5,169,577 A | 12/1992 | Feichtinger | |
| 5,204,055 A | 4/1993 | Sachs et al. | |
| 5,215,697 A | 6/1993 | Toki et al. | |
| 5,262,100 A | 11/1993 | Moore et al. | |
| 5,294,393 A | 3/1994 | Toki et al. | |
| 5,340,656 A | 8/1994 | Sachs et al. | |
| 5,366,684 A | 11/1994 | Corneau, Jr. | |
| 5,382,289 A | 1/1995 | Bambauer et al. | |
| 5,807,437 A | 9/1998 | Sachs et al. | |
| 5,849,229 A | 12/1998 | Holtzberg | |
| 6,139,619 A | 10/2000 | Zaretskiy et al. | |
| 6,325,958 B1 | 12/2001 | Lombardi et al. | |
| 6,344,160 B1 | 2/2002 | Holtzberg | |

(Continued)

FOREIGN PATENT DOCUMENTS

| | | | |
|---|---|---|---|
| JP | 54126626 | | 10/1979 |
| WO | WO02/26419 | * | 4/2002 |

OTHER PUBLICATIONS

English translation of Shinoda (JP54126626), dated Oct. 1979.*
Inorganic Binder article, Beachbox LaemeKuhs—Binder 2005.

(Continued)

*Primary Examiner* — Richard Crispino
*Assistant Examiner* — Robert Dye
(74) *Attorney, Agent, or Firm* — Hanley, Flight & Zimmerman, LLC

(57) ABSTRACT

A method of fabricating a three-dimensional printed part includes injecting a powder layer with an aqueous solution and curing the powder layer by depositing an acid gas on the powder layer to form a rigid structure.

18 Claims, 9 Drawing Sheets

U.S. PATENT DOCUMENTS

| | | |
|---|---|---|
| 6,437,034 B2 | 8/2002 | Lombardi et al. |
| 6,505,671 B1 | 1/2003 | McKibben et al. |
| 6,828,373 B2 | 12/2004 | Artz et al. |
| 6,843,303 B2 | 1/2005 | Siak et al. |
| 7,163,045 B2 | 1/2007 | Herreid et al. |
| 2004/0038009 A1 | 2/2004 | Leydon et al. |
| 2004/0056378 A1* | 3/2004 | Bredt et al. ............ 264/109 |
| 2004/0238157 A1 | 12/2004 | Hori et al. |
| 2005/0116136 A1 | 6/2005 | Artz et al. |
| 2006/0071634 A1 | 4/2006 | Meyer et al. |
| 2007/0246182 A1 | 10/2007 | Bovens |
| 2009/0014919 A1 | 1/2009 | Rossfeldt et al. |
| 2010/0121475 A1 | 5/2010 | Lyons |

OTHER PUBLICATIONS

Coremaker information [online] [retrieved on Jun. 6, 2008]; retrieved from www.palmermfg.com; Palmer Manufacturing & Supply, Inc.
International Search Report and Written Opinion from PCT Application No. PCT/US08/69555, mailed Oct. 1, 2008.
SME Technical Paper # TP06PUB2: "Manufacturing With 3DP, Examples of Casting, Composites and Thermal Spray", Brett Lyons, Mar. 2006. University of Michigan, Ann Arbor, MI 48109, UM3D Lab, Department of Mechanical Engineering.

\* cited by examiner

METHOD OF FABRICATING THREE DIMENSIONAL PRINTED PART

CROSS-REFERENCE TO RELATED APPLICATION

This patent claims the benefit of U.S. Provisional Application No. 61/184,610, filed Jun. 5, 2009, the contents of which are incorporated herein by reference in their entireties and made part hereof. This application is also related to U.S. patent application Ser. No. 12/794,494, filed on Jun. 4, 2010.

FIELD OF THE INVENTION

The present invention relates to a process and method for producing composite parts. In particular, this invention relates to mandrels for the mass production of polymer or composite structures, and to processes and methods for forming such mandrels at sufficient rates for mass production.

BACKGROUND OF THE INVENTION

Composite materials, such as fiber-reinforced composites, can be used to produce corrosion resistant and lightweight structures. "Composite material," as used herein, refers to a material comprised of two or more separate materials, which may include a fiber or polymer binder or a combination of the two. The most common composites are normally comprised of a fiber (Glass, Kevlar, Carbon, etc) impregnated with a polymer (Epoxy, Polyester, Urethane, etc). In comparison to lightweight metals such as aluminum, structures formed of composite materials have high strength-to-weight and high stiffness-to-weight ratios. As a result, composite materials have been used to fabricate a wide variety of structures including, most notably, aircraft structures.

In the aircraft industry, composite components were initially limited to secondary structures such as floorboards and engine cowlings due to limited experience with designing composite structures. However, as the mechanics of composite materials became better understood and higher quality materials were developed, its use increased as primary aircraft components such as flaps, wing sections, and even as the entire fuselage.

Currently, aircraft exist that have a fuselage and wings made substantially or entirely from composite materials. Aircraft manufacturers have increased their dependence upon composite materials to meet their ever-increasing demands for improved efficiency and lower costs. Composite materials also are used in automotive, recreational, military and defense applications, where the performance requirements may be even more demanding.

A significant drawback to the use of composite structures in aerospace applications, whether commercial or military, is the complicated and expensive tooling that is required for their fabrication, particularly when a seamless, hollow structure is desired. To form a seamless, hollow composite structure, the use of a mandrel or mold core is often preferred. The composite materials, generally fiber and resin, are laid up on the mandrel and cured by applying heat, time and pressure according to well-known methods. For many applications, the mandrel is a single use mold/tool that is destructively removed from the finished part either by a chemical process or by mechanical agitation.

Mandrels for composite structures are often made of plaster. Plaster easily pours into a mold and forms a solid structure but requires a significant curing time. Moreover, plaster is generally removed by mechanical agitation which can result in damage to the composite structure, after which the material is discarded as waste.

Other conventional materials used for making tooling such as mandrels include eutectic salts. These materials pose certain processing problems associated with removal of the materials from the cured parts, as well as with the disposal of the materials. Salt mandrels are brittle and must be cast into the desired shape while molten to avoid the need to machine them. Moreover, despite being soluble in water, eutectic salts produce corrosive, environmentally unfriendly waste streams when washed from the cured composite part.

An alternative method for producing a seamless, hollow composite part is to use an inflatable bladder as a mandrel within a reusable female mold form. Such a method is disclosed, for example, in U.S. Pat. No. 5,366,684. Upon inflation, the bladder presses the laid-up composite into the female mold form. The bladder process, however, is not useful for complex shapes and does not produce a composite structure with the same accuracy as a more conventional molded mandrel, particularly where the internal dimensions of the part are critical.

More recent improvements in mandrel materials provide organic and inorganic binders that are environmentally benign and water-soluble. The mandrel material is a composite blend including a matrix, such as sand, a binder, and water. One such binder is polyvinylpyrrolidone, or "PVP". The composite blend is prepared to a desired consistency, formed into a desired shape and cured. The resulting mandrel is strong and lightweight and easily can be shaped and subsequently removed from cured composite parts. Additives may be added to enhance the functional characteristics of the finished tooling material. These types of mandrel materials are disclosed, for example, in U.S. Pat. Nos. 6,325,958 and 6,828,373, both of which are incorporated by reference herein.

Utilizing the above processes (excluding the bladder technique) mandrels are currently formed using similar techniques, which involve the use of either a pourable material, such as eutectic salt or plaster, or a compressible material such as PVA and aggregate or sodium silicate and aggregate. Each of these processes can be very labor and time intensive.

Eutectic salts mandrels require the salt to be melted at temperatures in excess of 350° F. and, once molten, must be manipulated into a mold where it must cool and set for extended periods of time, often causing burns unless special protective clothing is worn. Further depending on the complexity of the mold and exposed cross section, significant amounts of water and time are needed to remove the eutectic salt from the mold, which also creates a highly corrosive waste stream.

Plaster is a more user friendly material, in that it can be prepared at room temperature and poured into a complex mold, but it also has several disadvantages. Since plaster is formed from the hydration of dehydrated salts, it is prepared from a dry powder material that is combined with water, which must be agitated to ensure proper mixing of the powder and water. This agitation leads to the formation of air bubbles within the material that can form significant defects in the resultant mandrel. Further, the plaster must be allowed to set, which is controlled by the temperature that the plaster is mixed at, as well as by additives to the mixture. Since this is normally a manual process, set times are around 10 min and can take as long as 45 min. Once set, the mandrel can be removed from the mold, but is not ready for composite layup, since it still contains significant amounts of water. This water must be removed to a sufficient level so as not to react with the composite system when the part is brought to temperature. Plaster is extremely time and energy intensive to dry since it forms a dense egg shell like skin, which acts as a heat and water barrier. Once a finished composite part is formed, the plaster material is either partially or completely water insoluble. Mechanical methods are then used to remove the mandrel often damaging the composite due to delamination.

Prior works have attempted to produce a water soluble plaster material that aids in the removal of the core from the finished composite part, but has come at the cost of reduced strength in the core. Further since these water soluble plasters still incorporate large amounts of water to pour the material there is a significant amount of time and energy needed to cure and dry the core.

Existing compressed material mandrels are comprised of moist sand-like materials that are packed or compressed into a mold to form the required shape. These materials can be labor intensive or require expensive tooling since the materials must normally be packed at high pressure to ensure uniformity in the mandrel. Further, complex shapes are very difficult to form since the materials are not very flowable and, as such, don't tend to fill molds with reverse cavities. However, since these materials start out with a very low density and open porosity, they can be readily dried or cured using a variety of techniques, for example $CO_2$ curing, hot gas infiltration, vacuum drying, microwave or oven drying.

Current materials used for soluble tooling details may pose either physical or process disadvantages that inhibit their widespread use. Currently, soluble tooling for composites may be made from molded eutectic salts, ceramic-binder combinations or plasters. Current soluble tooling material-process combinations may use either molding or machining to achieve the desired tooling details shape. However, this may add time and cost while reducing viable geometric complexity. The lead time for the molds required to produce a soluble mandrel may take from days to months to produce and may incur non-value-added cost to the final part.

Therefore, a material which is developed for use in three-dimensional printers (3DP) that can serve as a water-soluble tooling material for high temperature and pressure autoclave molding cycles is needed.

SUMMARY

The disclosure is generally directed to a method of fabricating a three-dimensional printed part. An illustrative embodiment of the method includes injecting a powder layer with an aqueous solution and curing the powder layer by depositing an acid gas on the powder layer to form a rigid structure.

In some embodiments, the method may include injecting an aqueous solution from a three-dimensional printer head onto a powder layer comprising a dry water-soluble binder and curing the powder layer by depositing an acid gas on the powder layer to form a rigid structure about 0.5 seconds after injecting the powder layer with an aqueous solution.

In some embodiments, the method may include injecting an aqueous solution from a three-dimensional printer head onto a powder layer having a mean particle size of about 40 microns and comprising a dry water-soluble binder and curing the powder layer by depositing an acid gas on the powder layer to form a rigid structure about 0.5 seconds after injecting the powder layer with an aqueous solution.

In some embodiments, the method of fabricating a three-dimensional printed part may include injecting an aqueous solution including water and a fluid binder from a three-dimensional printer head onto a first powder layer comprising alumina and silicon powder particles with a mean particle size of about 40 microns and a dry water-soluble binder including from about 1% to about 10% by weight polyvinylpyrollidone and from about 1% to about 30% by weight sodium silicate mixed with the powder particles; curing the first powder layer by depositing carbon dioxide on the first powder layer to form a rigid structure about 0.5 seconds after injecting the powder layer with the aqueous solution; and injecting at least one subsequent powder layer comprising alumina and silicon powder particles with a mean particle size of about 40 microns and a dry water-soluble binder including from about 1% to about 10% by weight polyvinylpyrollidone and from about 1% to about 30% by weight sodium silicate mixed with the powder particles adjacent to the first powder layer with aqueous solution including water and a fluid binder and curing the at least one subsequent powder layer by depositing carbon dioxide on the at least one subsequent powder layer to form a rigid structure comprising the first powder layer and the at least one subsequent powder layer.

BRIEF DESCRIPTION OF THE DRAWINGS

To understand the present invention, it will now be described by way of example, with reference to the accompanying drawings in which.

DETAILED DESCRIPTION

Further features and advantages of the present invention will be seen from the following detailed description, in which is shown various embodiments of the present invention. It is understood that other embodiments may be utilized and changes may be made without departing from the scope of the present invention.

The present invention relates to devices and methods for forming mandrels for use in the production of hollow composite structures, which devices and methods may be used for mass production of such mandrels. The mandrels are typically made from sand or other aggregate held together in the desired shape by means of a binder, and may include additional ingredients as well. In one embodiment, the process used to form the mandrel comprises mixing the aggregate with the binder, forming the mixture into the desired shape, then treating the mixture so that the binder hardens sufficiently so that the mandrel can be handled.

In various embodiments of the present invention, an aggregate material and a binder material, mixed to form a non-fluid aggregate/binder mixture, can be fluidized by imparting kinetic energy to the mixture, which allows the mixture to be inserted into a mold in a fluid manner. It is understood that the aggregate material and the binder material may contain more than one aggregate or binder, respectively. This aggregate/binder mixture may have a moist sand-like consistency in some embodiments. In one embodiment, such a non-fluid mixture may be fluidized by imparting kinetic energy into the mixture through entraining the mixture in a carrier fluid (such as air or nitrogen), allowing the solids to be displaced as a fluid. Once in the fluidized state, the mixture can then be directed/injected into a mold in a similar fashion as a pourable material. As the material enters the mold, the carrier fluid is removed, such as through properly placed vents, while the non-fluid mixture remains and is contained within the mold, filling the mold. Such techniques can afford the fast production of aggregate based mandrels that can be readily be dried/cured using a host of processes, such as gas cure or heat drying, as described below. It is understood that other means and techniques for fluidizing the aggregate/binder mixture may be used in accordance with the present invention. It is also understood that fluidizing the mixture involves causing a non-fluid material to behave in a fluid manner, but does not include transforming the material into a fluid phase (such as a liquid or gas).

Figure 1:
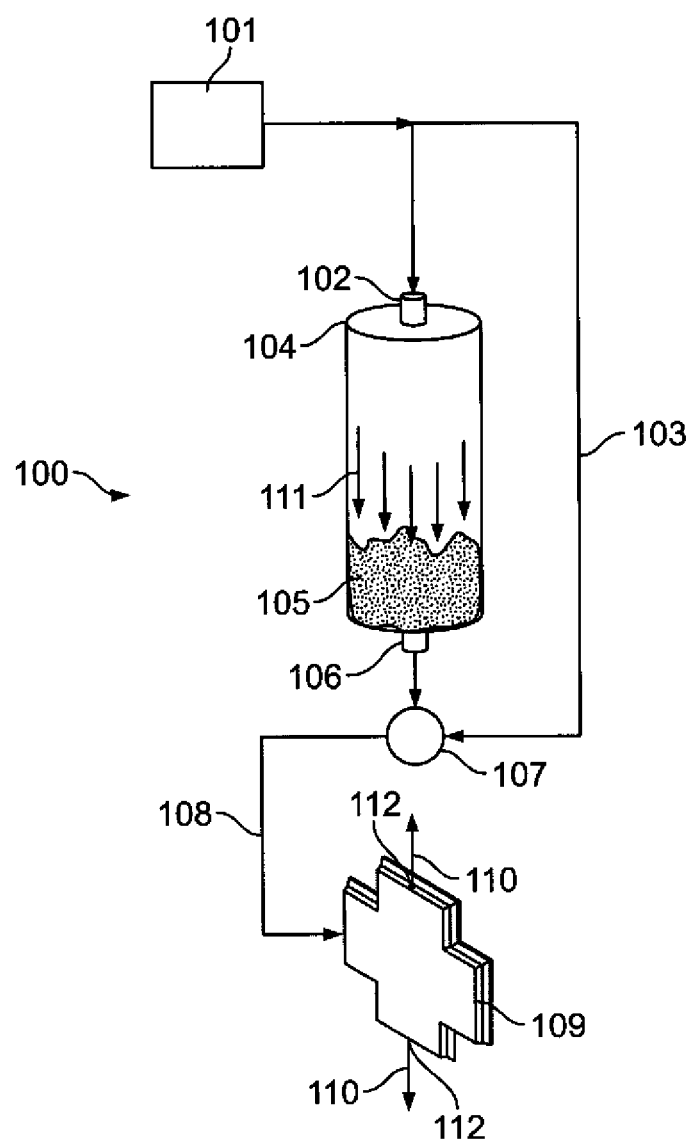
FIG. 1 is a schematic diagram of one embodiment of a system for mandrel fabrication using a pressurized material injection vessel.

In one exemplary embodiment, the aggregate/binder mixture can be carried into a mold using a pressurized material injection vessel 100 (e.g., a sand blaster), as illustrated in FIG. 1. The aggregate/binder mixture 105 is first placed into the sand blaster tank 104, and the tank 104 is sealed and an air supply 101 is connected thereto. The air supply 101 is split to provide air to the tank 104 through an entry valve 102 and also to a mixing valve 107 located downstream from the tank 104, through a separate line 103. When the entry valve 102 is opened to the system, air 111 is forced through the tank 104 toward the exit orifice 106 at the base of the tank. The aggregate mixture 105 is propelled along with the air 111 out of the tank 104 toward the mixing valve 107. As the aggregate mixture 105 enters the mixing valve 107 it is mixed with air from line 103 and propelled out into a fill tube 108 which directs the mixture to the cavity of a mold or tool 109. The aggregate mixture 105 collects in the mold and forms a mandrel in the shape of the mold 109. The second air stream (from line 103) that is passed through the mixing valve 107 may be forced at a sufficient rate so as to induce a venturi effect on the tank orifice 106, which helps draw the aggregate mixture into the air stream.

Once the aggregate mixture is entrained in the air stream, the aggregate can be directed as a fluid into a range of molds or properly vented housings for the ultimate production of the desired shape, such as the mold 109 shown in FIG. 1. Vents 112 within the mold 109 allow the fluidized material to move to the desired region in the mold 109, at which point the aggregate mixture 105 is separated from the air stream, which exits the mold to the environment, illustrated by arrows 110. In this embodiment, it may be desirable to mechanically agitate the sand blaster's tank 104, where the mixture 105 is stored, to ensure that the aggregate mixture 105 does not bridge as material is removed from the chamber, causing air pockets in the exiting stream. In one embodiment, after filling the mold 109, the fill tube 108 for the mold 109 can be used to infiltrate the mold 109 with a cure gas to cure the mandrel (as described below) using the same flow path as the injection of the mixture 105. Other gassing configurations are also possible, as well as other non-gaseous curing techniques.

Figure 2:
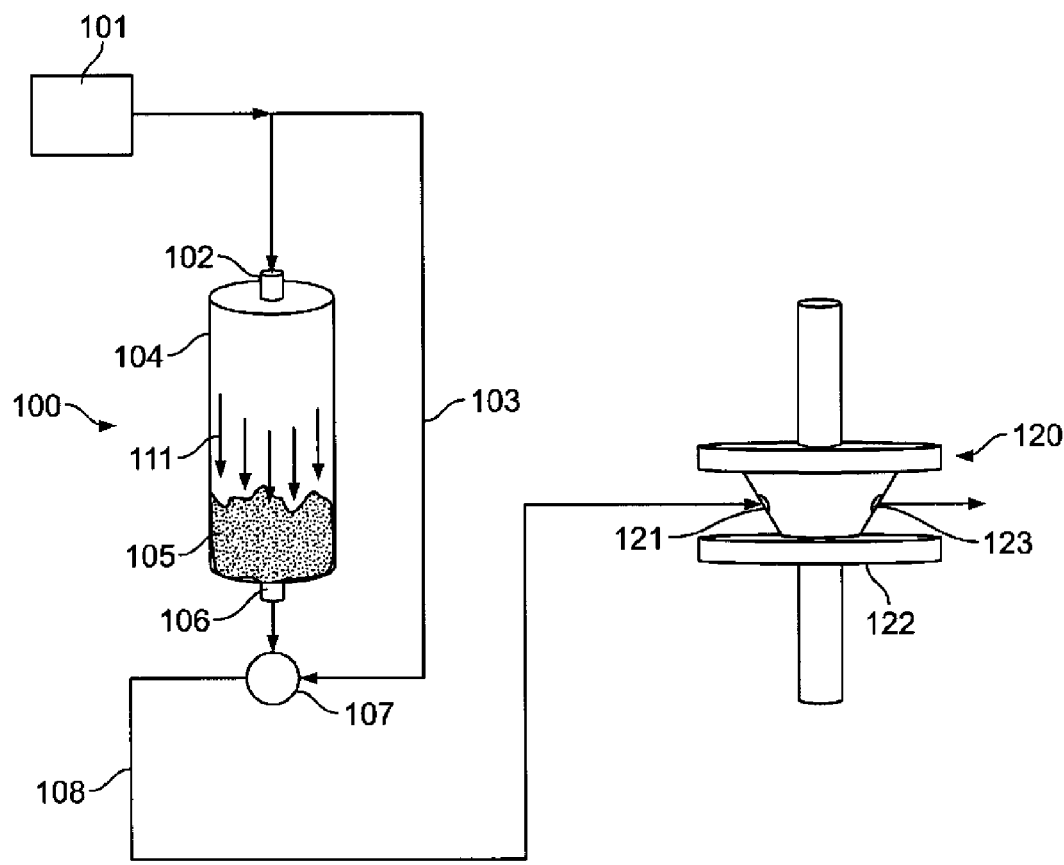
FIG. 2 is a schematic diagram of another embodiment of a system for mandrel fabrication using a pressurized material injection vessel and a pressing mechanism.

In another embodiment, the injection vessel 100 of FIG. 1 can be combined with a compaction system 120 as shown in FIG. 2. Similarly to the process discussed above the injection vessel 100 is utilized to propel the aggregate/binder mixture 105 into the mold fill line 108. In this embodiment, the material is directed into a mold 121 that is held in place under force from an external press 122. As in the mold 109 described above, the fluid is able to escape from the mold 121 through vents 123, while the mixture 105 remains in the mold 121. Once the mixture 105 has filled the mold 121 and the fluid has exited completely through the vent system 123, additional compaction of the formed mandrel can be accomplished through increased mechanical force using the external press 122. In this embodiment, the mold 121 is specifically designed to allow the cavity of the mold 121 to be filled and then compressed further to a final strength. The mold 121 may thus include complementary surfaces designed to allow room for parts of the mold 121 to move during compression. This configuration can create additional compaction and densification of the mandrel material. Although a vertical press configuration is shown, other types of pressing configurations may be used, including horizontal or isostatic pressing.

Figure 3:
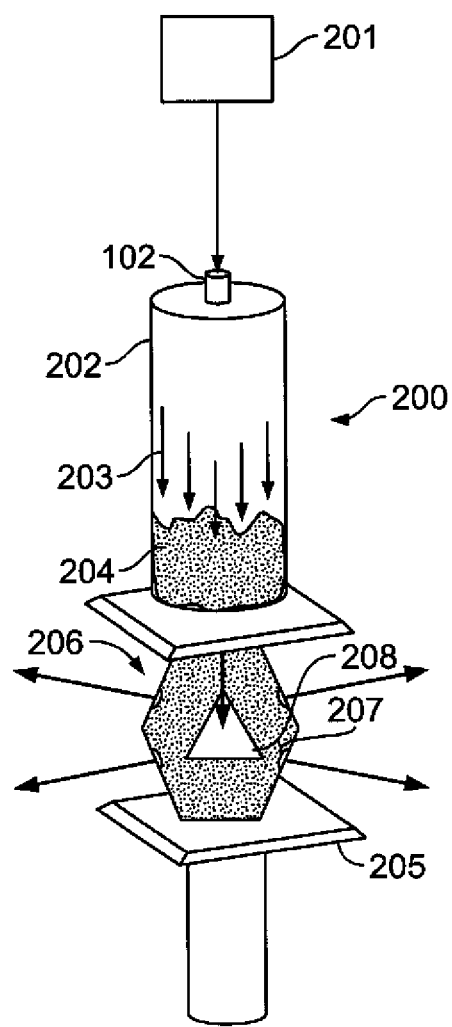
FIG. 3 is a schematic diagram of a further embodiment of a system for mandrel fabrication using a mold injection apparatus and a pressing mechanism.

In a further embodiment, an aggregate mixture can be carried into a mold using a pressurized material injection vessel 200 to inject the material directly into the mold, as shown in FIG. 3. As similarly described above, a mixture 204 of an aggregate material and a binder material is prepared and placed into an aggregate mixture chamber 202. The chamber 202 is connected to a cavity 208 of a mold or tool 206 to allow the contents of the chamber 202 to flow into the mold 206. A volume of air or other fluid 203, from a pressurized source 201, is passed through the aggregate mixture chamber 202, forcing the material 204 out of the chamber 202 and into the mold 206. In a configuration such as shown in FIG. 3, a higher kinetic energy can be imparted to the aggregate mixture by significantly increasing the flow rate of the fluid 203 that is able to enter the aggregate mixture chamber 202. Vents 207 within the mold 206 allow the fluid to exit the mold 206 and flow into the environment after distributing the material throughout the mold cavity 208, while the material 204 remains in the mold cavity 208.

As shown in FIG. 3, a mechanical press 205 can also be applied to the mold 206, which is used to hold pieces of a multi-piece mold together. As also described above, although a vertical press configuration is shown, other types of pressing configurations may be used, including horizontal or isostatic pressing.

Figure 4:
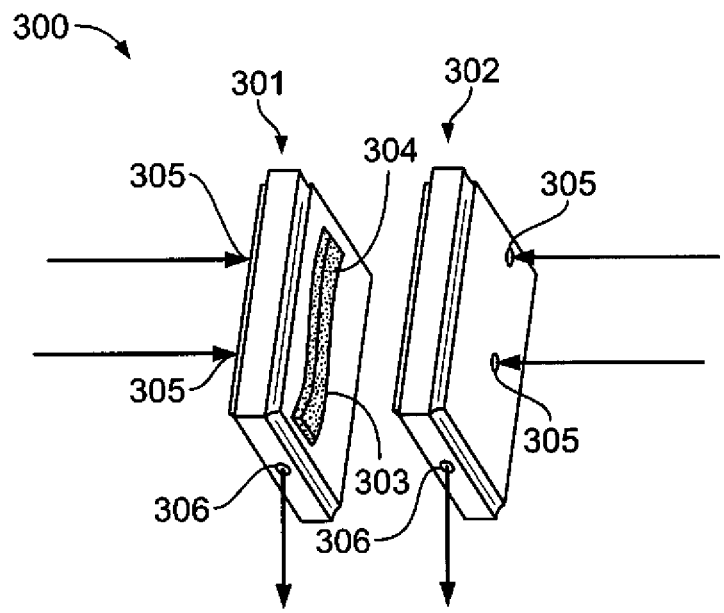
FIG. 4 is a schematic diagram of one embodiment of a mold for use with mandrel forming methods according to the present invention.

Assemblies such as those shown in FIGS. 1-3 can be used as a mandrel making machine capable of mass producing mandrels, which are, in turn, used to produce composite parts. A mixture of sand or other aggregate with a binder is prepared and injected into a mold, such as in a manner described above. The mixture may advantageously be prepared to a consistency that allows the mixture to completely fill the mold without a void. One exemplary mold 300 is shown in FIG. 4. The mold 300 includes two mold halves 301, 302 that are pressed together to form an internal mold cavity 303 for formation of a mandrel 304. Each mold half 301, 302 contains at least one inlet port 305 for injection or inlet of material such as in the manners described above with respect to FIGS. 1-3, and at least one outlet port 306 to allow fluid to escape therefrom after the aggregate mixture is deposited within the mold cavity 303. In the embodiment shown, the mold 300 includes multiple inlet ports 305, which may be provided by a manifold, as described below. It is understood that in some embodiments, only one of the mold halves 301, 302 may contain an inlet port 305 and/or an outlet port 306. It is also understood that a different mold configuration may be used to form a mandrel.

Figure 6:
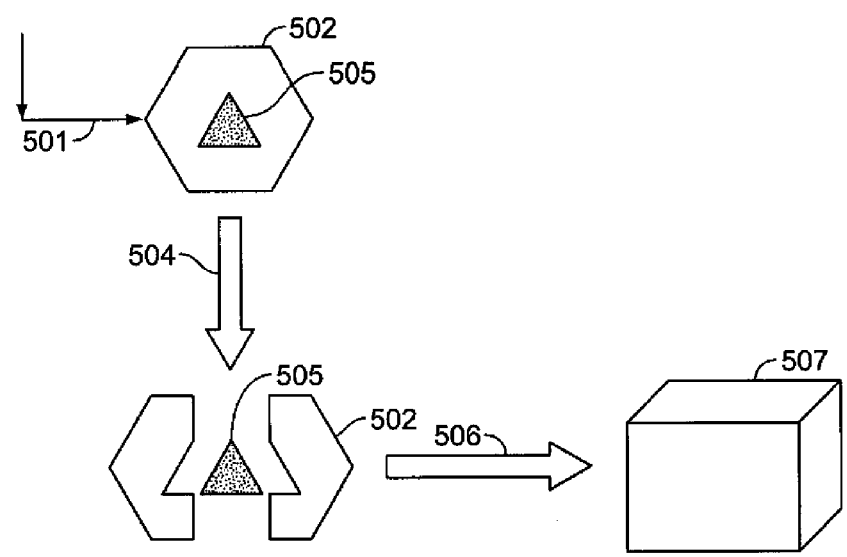
FIG. 6 is a schematic diagram of one embodiment of a multi-step method for drying/curing a binder and aggregate composition.
Figure 8:
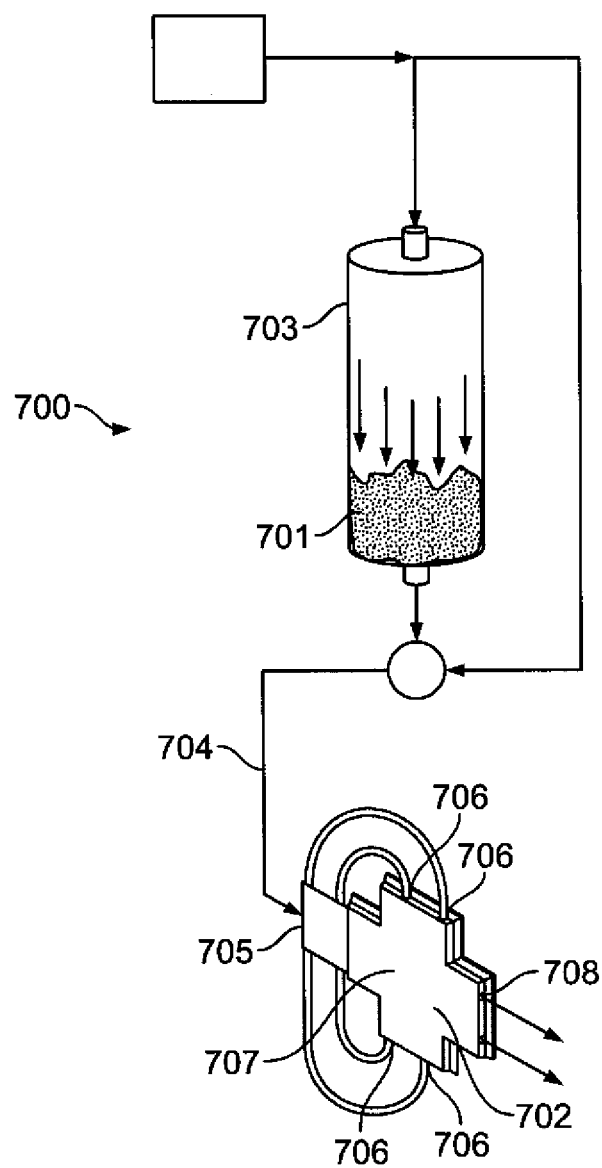
FIG. 8 is a schematic diagram of one embodiment of a system for mandrel fabrication using a pressurized material injection vessel and a distribution manifold.

FIG. 8 illustrates an exemplary embodiment of a system 700 for distribution of the fluidized aggregate mixture 701 into a mold 702 using a pressurized material injection vessel 703 (e.g., a sand blaster), which, in this embodiment, is similar or identical to the injection vessel 100 shown and described in FIG. 1. In the embodiment shown in FIG. 8, the injection vessel 703 has a hose 704 coupled to a manifold 705, and the manifold 705 is coupled to the mold 702 and distributes the flow of the aggregate mixture 701 to provide multiple injection ports 706 for injection of the mixture 701 into the mold cavity 707. The cavity also has outlet ports 708, as depicted in FIG. 6. Further the initial injection vessel 703 may contain multiple output ports so as to supply multiple injection ports 706 in the mold 707.

In different embodiments, the mold may be configured with either horizontal or vertical parting lines. Additionally, in one embodiment, the mold has a single parting line, but in other embodiments, the mold may have multiple parting lines. For example, a mold with multiple vertical parting lines may include multiple injection devices to accelerate the process. Some mandrel shapes, however, may be better suited for production in horizontal parting line molds. For example, horizontal parting line molds may be more suitable when large mandrels are to be produced in one mold, so that the cavity for forming the mandrel extends relatively far from the injection means. Similarly, if several mandrels were to be made simultaneously using a mold with multiple cavities, a horizontal parting line mold may offer better performance.

The mixture is injected into the mandrel form (mold) by an injection means, such as the injection means discussed above. If necessary, water or another liquid may be added to the material such that a desired viscosity is reached for "shooting" the mixture into the mold. The injection means may utilize compressed air, gravity, or any other means capable of mobilizing or fluidizing an aggregate/binder mixture. The injection means may additionally be used to inject the mixture into multiple molds at a time.

Once the mold has been filled with the aggregate/binder mixture, one or more processing methods can be adopted to process the mandrel into a desired state for use in polymer or composite manufacturing. Generally, the filled mold is treated to activate the binder in the mixture or to otherwise harden the mixture such that the mandrel retains its shape upon being removed from the mold. In one exemplary embodiment, the process of treating the mandrel is designed to take a very short period of time, such as on the order of seconds, so that the formed mandrel may be removed from the mold and the mold may be filled again rapidly, facilitating a process capable of being used to mass produce mandrels. In certain embodiments, the entire process of molding the mandrel can take less than two minutes, and in one embodiment, less than one minute. Depending on the composition of the mixture used, and, in particular, the type of binder(s) used, the mandrel may be treated initially by one of a number of methods.

Figure 5:
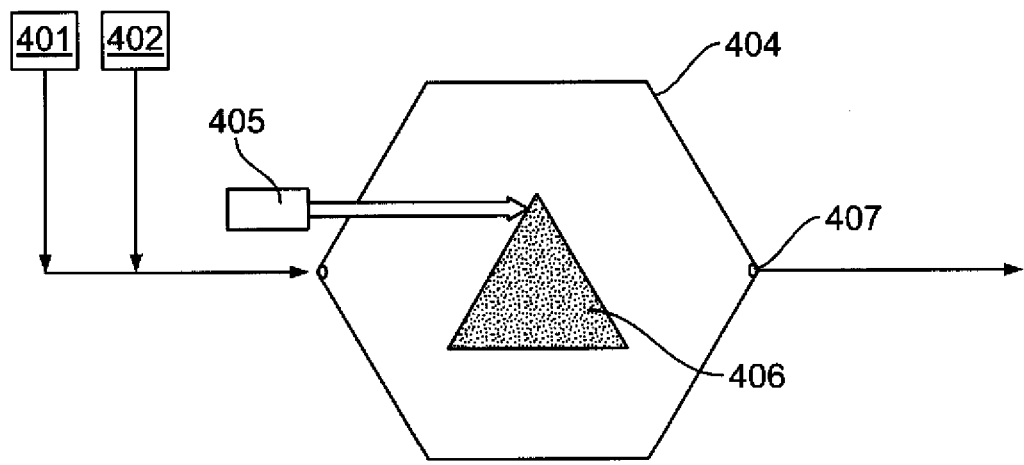
FIG. 5 is a schematic diagram of one embodiment of a method for drying/curing a binder and aggregate composition within a mold.

One embodiment of such a treating method is fluid exchange dehydration, an example of which is illustrated in FIG. 5. As shown in FIG. 5, a drying gas 401, such as air, is passed into the mold 404, where it contacts the moist material forming the green mandrel 406, picks up moisture, and exits through vents 407 in the mold 404. The mold may include one or more inlets and one or more outlets for the stream of gas to pass into and out of the form and may pass over the mandrel in multiple directions to shorten the duration required for treatment. As described above, in one embodiment, the same inlets and outlets used when filling the mold with the aggregate mixture can be used for infiltrating the mold with the drying gas.

In some embodiments, maintaining low water vapor pressure and relatively high temperature in the drying gas stream 401 can increase the rate of removal of water or other liquid. Heating the mandrel 406 through the mold 404, as described in the hot-box techniques below, can also increase the rate of liquid removal. This will further reduce the treating time and curing time of the formed mandrel, and can increase mass production rate. In addition, a vacuum (not shown) can be advantageously applied to exit vents 407, along with any of the above-described configurations. In one embodiment of this technique, a hot gas is heated to about 150° F.-250° F. and passes through the mold for a period of about 30 seconds to two minutes. It is understood that this time may be varied depending upon the temperature of the hot gas, the mixture composition, the size of the mandrel, and the configuration of the mold in allowing hot gas to pass over the mandrel. In another embodiment, a similar drying technique would utilize only bone dry gas or a combination of both dry and hot gas to dry the mandrel through dehydration/evaporation. Materials that can be subjected to dehydration in this manner include inorganic salts (sodium silicate, phosphates, $MgSO_4$ etc) and organic binders (PVP, PVA, protein etc).

In another embodiment, a cold-box or no-bake method, such as a reactive gas curing method, advantageously may be used to treat the green mandrel, wherein the cure of the mandrel can take place without heating the mold. This is typically effected by exposing the mandrel to a curing agent, usually in gaseous form. For example, if the binder is acid curable, a vaporized amine solution or carbon dioxide vapors may be used. The configuration illustrated in FIG. 5 can be used for a reactive gas curing technique as well. In such an embodiment, instead of applying a drying gas to remove water from the mandrel 406, a reactive gas 402 can be introduced into the mold in addition to, or in place of, the drying gas 401. The reactive gas 402 forces a phase change or reaction within the binder of the mandrel, which then produces the desired strength in the mandrel. Depending on the binder and the curing agent, this process typically takes a very short time, and may take less than 30 seconds. In one embodiment, the treating process with a curing agent may be completed in 10 seconds or less. Many different types of binders are usable with reactive curing techniques, including sodium silicate, Isocure™, or any other binder system that undergoes a chemical reaction to reach a hardened or semi-hardened state.

A further embodiment of a treating method that advantageously may be used to cure/strengthen the mandrel is a hot-box method, wherein the mandrel materials are hardened by heating the mold. This effectively removes liquid (such as water) from the formed mandrel and hardens certain binder materials, including many water-soluble binders and nonwater-soluble binders. One such means of heating the mandrel 406 is application of internal microwave energy 405 or other heating energy within the mold 404, as illustrated in FIG. 5. Accordingly, in one embodiment, the mold 404 may be constructed of materials that allow the mandrel 406 to be exposed to microwave energy 405 while still in the mold, such as PVP or PVA or other dehydration strengthening binders combined with a porous aggregate. The heating treatment generally takes place at least long enough for the mandrel to achieve sufficient green strength to enable handling without damage to the mandrel or its shape. This can take anywhere from several seconds to minutes. If the mandrel is not fully dried before removal from the form, further drying of the mandrel, which may be required before lay-up of composite fiber and resin, can take place over time during storage or shipment, as described below. For this method of treating, it may be advantageous for the mold to comprise a material with a high thermal conductivity, such as steel, aluminum, Invar, etc.

Certain mixtures may have sufficient green strength to be removed from the mold almost immediately after loading or after a very short treatment under one of the methods listed above. The curing process for these mandrels may continue as the mandrels dry in storage or shipment, as described above, or the curing process may be further effected by some other means. For instance, curing may be completed by exposing the mandrel to a curing agent, baking the mandrel in an oven, or irradiating with microwave energy. This secondary treating process may further enhance the overall efficiency of the mandrel production process.

One example of such a two step curing process is shown in FIG. 6. An initial strengthening technique 501 is used to impart the mandrel 505 with sufficient strength to be removed from the mold 502. The hot gas drying, hot-box, or cold-box reactive curing techniques described above can be used, for example, as the initial strengthening technique 501. After the initial strengthening, when the mandrel material has reached sufficient strength for handling, the partially-hardened or partially-cured mandrel 505 is removed 504 from the mold 502 and placed 506 into a secondary treatment process 507 for further strengthening. Such a secondary treatment process 507 may include, without limitation, convection oven heating, exposure to electromagnetic waves (such as microwave heating), chemical reaction, exposure to another energy source not listed above, placing in a vacuum chamber, placing in a dry environment, placing in a shipping container with or without a desiccant, or any mixture of such techniques.

For example, in one exemplary embodiment, the mandrel material mixture contains a primary binder that provides good strength and desirable properties and a secondary binder that strengthens quickly to permit removal of the mandrel from the tooling before the primary binder is hardened. As described above, the primary binder can be hardened after removal, leaving the mold free for production of additional mandrels, increasing production rate. In one embodiment, the mixture includes a primary binder that is water-soluble and environmentally benign, such as polyvinyl pyrrolidone (PVP), and an additive that may be treated with a gas, such as sodium silicate, also called water glass. Uncured PVP has very little green strength and is generally cured by a hot-box process which requires that the mandrel remain in the mold during this process. The water glass component of the binder, however, may be quickly fixed by passing carbon dioxide ($CO_2$) or any other slightly acidic gas through the mold for only a few seconds, after which the mandrel retains sufficient strength to allow handling. In this manner, the mandrel may be removed from the mold and cured using microwave energy. The microwave energy cures the mandrel in only a few seconds, after which the dry strength of the PVP provides a durable mandrel that is relatively lightweight and water-soluble.

A mandrel mixture composition according to the present invention may typically include sand and/or other aggregate(s), a binder or combination of binders, and possibly additional additives to improve the characteristics of the mandrel in a particular application. In many embodiments, the water soluble binder/aggregate mixtures have binder concentrations that range from less than 0.5% binder to weight of aggregate to over 50%. The amount of binder utilized can be determined by the desired ultimate strength and drying time. Additionally, in some embodiments, water content in the binder/aggregate mixture is kept to a minimum, in order to facilitate drying/strengthening of the mandrel. For example, water contents of less than 10% are typical of some embodiments. Further, in some embodiments, it is preferable for the aggregate and binder mixture used to produce the mandrel to possess a porosity greater than about 20%. Too low a porosity within the uncured mandrel material can lead to the formation of steam pockets within the mandrel that can produce pathways in the mandrel or even complete deformation.

Various different aggregates, or combinations thereof, may be used in different embodiments of the binder/aggregate mixture. Sand is one suitable choice for the aggregate component of the mixture because of its availability. However, other aggregates may be chosen for various reasons, such as their compatibility with a particular binder, their consistency, or their capacity to undergo a reclamation process after being removed from the finished composite structure. Examples of other particulate materials which may be employed as aggregates or as additives include glass or polymer microspheres, pumice, graphite or coke particles, small steel shot, glass beads or bubbles, small polypropylene pellets, alumina, cenospheres, and clays. A combination of two or more of these materials may also be used. Particle size is often directly related to surface quality, aggregate density, and packing density, and in one embodiment, particle sizes of between about 100 microns and about 300 microns are utilized. The resultant aggregate density can vary from about 0.4 to about 2 g/ml, in one embodiment. Higher aggregate densities can results in higher compaction, but may not be ideal for some applications, since particle size also plays an important role. Other density considerations may include mandrel geometry, since higher density aggregates can result in higher stresses being exerted on the mandrel.

A binder or combination of binders can be chosen based on a number of factors, including the duration of time required to treat the mandrel until it reaches a level of hardness to allow handling, the tensile strength of the binder in connection with the chosen aggregate when fully cured, the cost of the binder, the viscosity of the mixture when the binder and aggregate are combined, the water-solubility of the binder, and the environmental byproducts of the curing and removal processes. Ultimately, the proper binder can be determined with reference to the specific properties necessary for the finished composite part. Certain mixtures of salts and aggregate produce a fairly weak and brittle mandrel that is not readily usable in most composite preparation techniques, but will withstand the conditions necessary for a wet lay-up of composite material. Such a low strength salt mandrel can be prepared quickly and inexpensively using currently available binders and machinery. Tensile strengths for this type of mandrel are usually on the order of 100 PSI. These binders include, but are not limited to, $MgSO_4$, phosphates, sodium silicate, etc.

Other applications may be better suited to different binder systems. For example, in more demanding applications and in mandrels that may require secondary machining after fabrication, a range of hybrid systems may be used for manufacturing the mandrel, including, but not limited to, combinations of organic and inorganic binders. As described above, in one exemplary embodiment, a water-soluble hybrid binder composition includes sodium silicate and PVP. For example, such compositions can range from about 1-20% weight sodium silicate and about 1-30% weight PVP, in various embodiments with the remained being comprised of aggregate and/or additive. Specific binder compositions and ratios may vary, dependent on factors such as the aggregate type and size and the effective surface area of the binder. In many embodiments of hybrid compositions, the organic component affords a mandrel with better machinability, which also is capable of attaining higher strengths for demanding applications. PVP is one such suitable organic binder, due to properties such as water-solubility, low viscosity, high tensile strength, and environmentally benign nature. Many other water-soluble binders may be used with other embodiments, including but not limited to various salts (including sodium silicate), phosphates, gelatins, water-soluble hemicellulose, water-soluble polymers, and poly vinyl alcohol. Other non-water-soluble materials may also be appropriate as binder materials, including phenolics and many organic polymers.

Various specific compositions have been found to have advantageous properties when used in connection with the production methods described herein. One exemplary binder/aggregate composition includes about 3-10% PVP, about 3-10% liquid sodium silicate, (40 baum), about 7-17% water, and about 70-77% cenospheres. This composition produces a high strength, acid gas-curable mandrel material having good green strength with average coefficient of thermal expansion (CTE) less than 10 ppm. Additionally, the mandrels resulting from this composition generally have good surface finish and water solubility. Another exemplary composition includes about 3% PVP, about 17% water, and about 80% cenospheres. This composition must be dried to gain green strength and has similar CTE values to the immediately preceding composition. Additionally, the mandrels resulting from this composition generally have good surface finish and are highly water soluble. A further exemplary composition includes about 20% sodium silicate (40 baum) and about 80% cenospheres. This composition is a very fast acid gas-curable composition, and is water-insoluble at room temperature. It also produces mandrels with good surface finish.

Additives may be used to enhance the performance of the mandrel and materials in any of the above embodiments. Such materials include alkaline hydroxides, e.g., NaOH, water and various organic and inorganic additives. Less than 1% additives is necessary in many exemplary compositions. Minor amounts of other additives, such as surfactants, may be present. The surfactants may be anionic, nonionic, cationic, amphoretic or mixtures thereof. Examples of water soluble surfactants are anionic surfactants selected from organic sulphates, organic sulphonates and organic phosphate esters, e.g., potassium 2-ethylhexyl phosphate. Certain surfactants also operate as flow control agents. Other additives include humidity resistant additives, collapsibility (or breakdown) enhancers, preservatives, dyes, bulking agents, hot strength additives, or flow enhancers. Humidity resistant additives include, for example, potassium tetraborate, zinc carbonate, zinc oxide. Collapsibility (or breakdown) enhancers include, for example, sugar, e.g., sucrose, dextrin and sawdust. Refractory coatings, such as silica in a solvent, may be used to impart a finished surface to the mandrel. Of course, the additives may be added in combination or singly.

Preservatives may be added to prevent mold and spoilage of the binders during storage. Amounts of such preservatives will vary depending upon the preservative employed, but generally, amounts up to about 1 percent by weight are considered sufficient. In one embodiment, sodium benzoate is used as a preservative, and is typically utilized in an amount of about 0.2 percent based upon the weight of the binder. Essentially any preservative which is compatible with the binder and various other additives and which is environmentally safe can be used in the present invention.

After treating and removing from the mold, a mandrel may require machining or other processing to form the desired shape. Depending on materials used and their cure, further curing may be required prior to machining the mandrel.

The invention further relates to methods for manufacture of composite or polymer parts or components, including complex parts such as ductwork which provides a passageway for channeling air, gases, fluids, wiring or the like. The type of composite or polymer product is, however, not a limiting feature of the invention. One aspect of the invention is the ability to manufacture composite parts at efficient rates, so that the parts can be effectively mass produced in an economic manner. In general, polymer or composite materials (including precursor materials) are placed into contact with the mandrel in order to impart the shape of the mandrel to the final polymer or composite product. One such production method involves wrapping the mandrel with materials to produce the final product. The mandrel can also be used for a range of other known processing techniques like plastic injection, RTM, VRTM, etc.

By way of example, in producing a composite product, a preformed mandrel of the type described above may be wrapped with or otherwise coated with a polymer or composite material (which may include precursor materials). The coated material may then be cured by heating, exposing to light energy, etc. Techniques for curing such polymer or composite materials are known in the art, and vary by the type and nature of materials used. Then the mandrel may be removed, for example by solubilizing in water, to open a formed passageway in the formed part. The mandrel, having been formed by efficient production speed techniques coupled with its use as a means to form the internal configuration of composites which are processable at efficient production speed levels enables the economic production of polymer or composite parts. The production efficiency can be further enhanced by the ability to remove the mandrel material from the composite part quickly, efficiently and without damage to the formed composite, such as through the use of water-soluble binders. Making the mandrels and using them with composites thus enables economic manufacture of complex composite and polymer parts, particularly those having complex internal hollows, chambers and passageways. For example, components such airducts and hollow structural components such as air frames, bikes and bike frames, car frames, and plane hulls can be manufactured using composite materials using the mandrels and methods described herein. Parts may be produced using the principles described herein for use in motor vehicles, boats, bicycles and other transportation vehicles, as well as other structures for various other industries. Examples of composite materials that can be used in accordance with embodiments of the invention include epoxy- or phenolic-based polymer binders impregnated into different fiber systems, such as fiberglass, Kevlar, carbon, etc. It is understood that these examples of components and materials are not exhaustive, and that a wide variety of components and materials can be manufactured.

Figure 7:
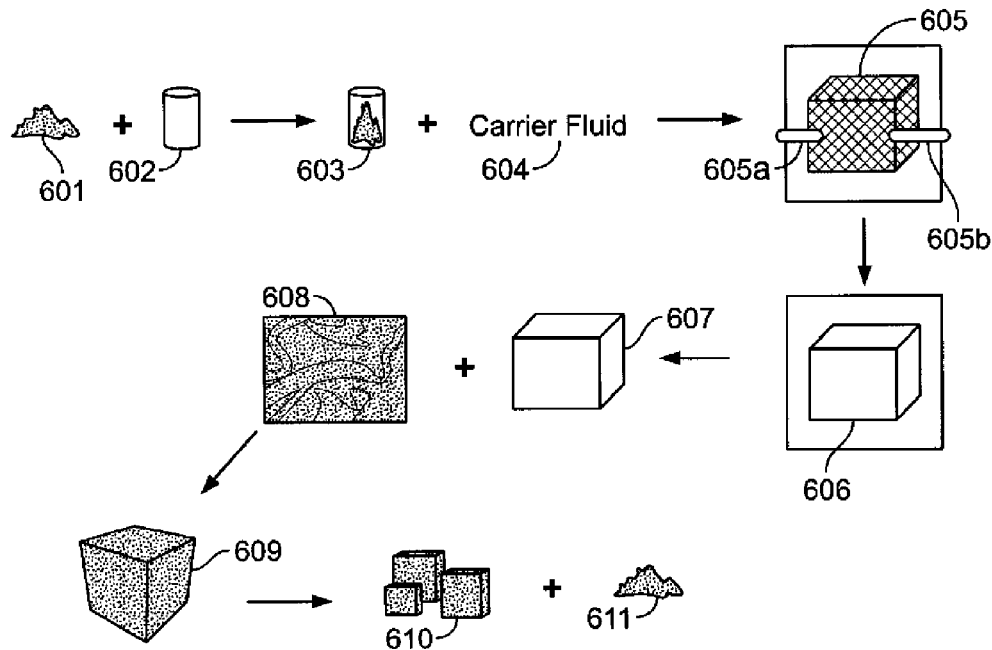
FIG. 7 is a schematic diagram of one embodiment of a method for production of a composite part according to the present invention.

FIG. 7 illustrates one exemplary embodiment of a production method 600 according to principles of the invention. The aggregate material(s) 601 are first mixed with binder material(s) 602, as well as potentially other additives, to form the binder/aggregate mixture 603. This mixture is then placed in a fluidized state by imparting the mixture in a carrier fluid 604. Once in the fluidized state, the mixture 603 and carrier fluid 604 are propelled via a pressure gradient into a mold 605 with a vented cavity. The material 603 enters the cavity through a fill port 605a and is separated from the carrier fluid 605 using a screen or filter at the dedicated vents 605b. After the cavity is filled with the material 603 to form the green mandrel 607, additional processing 606 is performed to facilitate removal of the mandrel 607 from the mold 605. As described above, this can accomplished in a variety of ways, ranging from complete curing within the mold or initial curing and removal for post drying/curing. Curing within the mold can be accomplished through techniques described above, such as removal of water (via heat, air, vacuum, microwave, etc.) or chemical reaction (crosslinking, precipitation, polymerization, etc.). Multi-step curing processes described above can also be used, where the mandrel 607 can initially be cured enough to gain partial strength for removal, forming a partially-cured or partially-hardened mandrel, and the partially-hardened mandrel can then be post-cured using any of the above techniques. The initial curing and removal can allow the mandrel to be removed and the mold recovered more quickly for continued processing.

After the mandrel 607 has been fully cured, it can then be used for producing a finished composite or polymer part. A release layer may be applied to the mandrel before part production, such as in the form of a sealer, which stops the resin/polymer systems of the composite or polymer product from penetrating the mandrel material. In the above illustration, the mandrel is covered with a polymer-impregnated fiber 608 to create a composite form 609 of the desired shape. Once in the desired shape, depending on the utilized resin/polymer system, the part may be cured, for example by using techniques such as vacuum, heat, UV, and chemical means. After reaching the desired cure state, the composite part 610 is then ready for mandrel removal. The part can be cured using any known technique, depending on the material, including without limitation application of heat, application of pressure, application of light or other electromagnetic wave, chemical reaction, exposure to another type of energy source other than the above, placing in a vacuum chamber, placing in a dry environment, or any combination of said techniques. The mandrel can be removed using a range of techniques from mechanical agitation to water dissolution, depending on the binder/aggregate composition. In one embodiment, where the mandrel 607 includes a water soluble binder composition, the mandrel is solubilized by application of water thereto, which breaks up the mandrel 607 and washes away the insoluble components of the mandrel, without damaging the produced article. The final product is a finished composite part 610 and the removed mandrel materials 611. In one embodiment, the aggregate and water may be reclaimed upon removal of the mandrel from the finished composite structure.

The invention further relates to methods for removing a mandrel from a finished composite part after the product has been molded and cured. Where a water-soluble binder is used, mandrels may be removed from a finished composite structure by exposing the binder and aggregate particles to an effective amount of water to dissolve the binder and disintegrate the mandrel, and then removing the aggregate particles from the cavity of the molded product. The environmental impact of water-soluble binders may be considered in choosing a method for removing the binder material, as not all of the byproducts of water-soluble binders are environmentally benign.

In one embodiment, the water may be sprayed into the structure at high pressure to remove the mandrel material more quickly. Alternatively, the water may be heated to a temperature below boiling which may dissolve particular binders more quickly. Yet another alternative would be to jet a stream of water into the finished composite structure to break the bonds of the water-soluble binder, and then removing any remaining mandrel material either with water directly or by mechanical agitation. Each of these methods can be performed in less than 30 minutes for most mandrels, and many mandrels may be fully removed in less than one minute.

With certain binders, the rate at which the bonded sand mandrel is weakened by exposure to water may be accelerated by pretreatment of the sand mandrel. In some exemplary embodiments, this pretreatment involves immersing the sand mandrel in a dilute alkaline solution or hot water for from one to ten minutes, drawing the alkaline solution or water through the mandrel, and/or blowing steam through the mandrel. The alkaline treatment is particularly suitable for composite materials which are not affected by alkali. Examples of useful solutions for this method include dilute alkaline solutions of sodium hydroxide, potassium hydroxide or sodium carbonate, which are relatively benign and relatively inexpensive.

Mechanical agitation also may be used to remove the mandrel from the composite structure. In one embodiment, the mandrel may first be conditioned by steam, water, or some other removal agent to initially break at least some of the bonds of the mandrel. A mechanical means may additionally or alternately be provided to break the mandrel into pieces while within the composite structure. Once the mandrel has been weakened by chemical or mechanical means, the finished composite structure is agitated by shaking or some other method to remove the rest of the mandrel material. This is a typical method of removal for most non-water-soluble binders, including various organic compounds and phenolics.

The invention also relates to mandrels produced using the above materials, methods, and machines. In one embodiment, a mandrel produced as described above includes a water-soluble organic or inorganic binder, or a combination of organic and inorganic binders, and one or more aggregate materials, such as sand, ceramic spheres, etc., as described above. It is understood that various embodiments of the mandrels described herein may contain any of the materials and additives described above for use in manufacturing the mandrels. Additionally, the mandrels manufactured as described herein can be used for the methods of forming composites described herein.

EXAMPLE

In one example, an air duct was created utilizing a bisphenol/epichlorohydrin-based impregnated woven carbon fiber pre-preg. A seamless air duct was formed by first producing an injection tool with the desired part shape machined into a splittable cavity. The tool was constructed to be ported to allow the carrier fluid to escape as needed. A binder/aggregate mixture was made by combining 80% cenosphere aggregate, 3% PVP, 3% sodium silicate (40 Baum) and 14% water. A green mandrel was then produced through injection of an aggregate/binder mixture into the carrier chamber under injection pressures of around 50 psi, with the carrier fluid being exhausted into environment. An acid gas ($CO_2$) was then passed into the tool cavity to partially harden the mandrel, under gas pressures of 40 psi or more, to ensure maximum contact with the mandrel. After 30 seconds of gassing, the tool cavity was split open and the mandrel ejected. The partially-hardened mandrel was then post-cured in a microwave oven for 90 seconds before sealing. Once sufficient water was removed, the mandrel was sealed, first utilizing a filler material (such as Holcote™) to close the mandrel's outer porosity and then finish coated with a plaster primer (such as Valspar™). After the sealer was completely dried, a release agent (such as Freecote™) was applied to the mandrel to aid in the release of the composite.

A prepreg composite material was then wrapped around the finished mandrel in a manner so as to produce uniformly distributed layers, as is familiar to those experienced in the art. After the composite material was laid up on the mandrel, a release layer was applied (such as Peel Ply, Pourous Release Film etc.). Then the mandrel was wrapped in a breather material, allowing a vacuum to be well-distributed around the mandrel. After the breather was applied, the mandrel was bagged in a vacuum-tight envelope and a vacuum was applied to the part. The part was then placed into an oven for curing at 150° F. for 1 hour. The resultant structure contains tightly packed carbon fiber with typically less than 40% epoxy, and the epoxy hardened to form a strong finished part. The part was then cooled, removed from the oven, and de-bagged, and the release layer was removed, leaving the finished part with the mandrel still intact.

To remove the mandrel, the part was submersed for several minutes in a container of water and rinsed out using jetted water. The mandrel was thereby dissolved and removed from the finished composite part, which was then allowed to dry, leaving a seamless hollow composite part. The total process from injection of the material to the finished composite part for this specific example was around two hours. The above example is intended to be a representative embodiment of the mandrel and methods described herein, and is not intended to be exclusive or limiting in any way.

The products, materials, methods, and machines disclosed herein provide several advantages over prior products, materials, methods, and machines. For example, in certain embodiments where a water-soluble binder is used, the mandrel may easily and rapidly be removed from the composite structure in less than a minute or two simply by immersing the composite structure and mandrel in a plain water bath or by subjecting then to steam. A particular advantage of the present invention is that machining and finishing operations on the mandrel can be eliminated and the mandrel may be used for forming of either interior or exterior complex product surfaces. Additionally, the mandrel is dimensionally stable and is able to withstand high pressures.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. All component percentages described herein refer to weight percentages, unless specifically identified otherwise. The term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

Figure 8A:
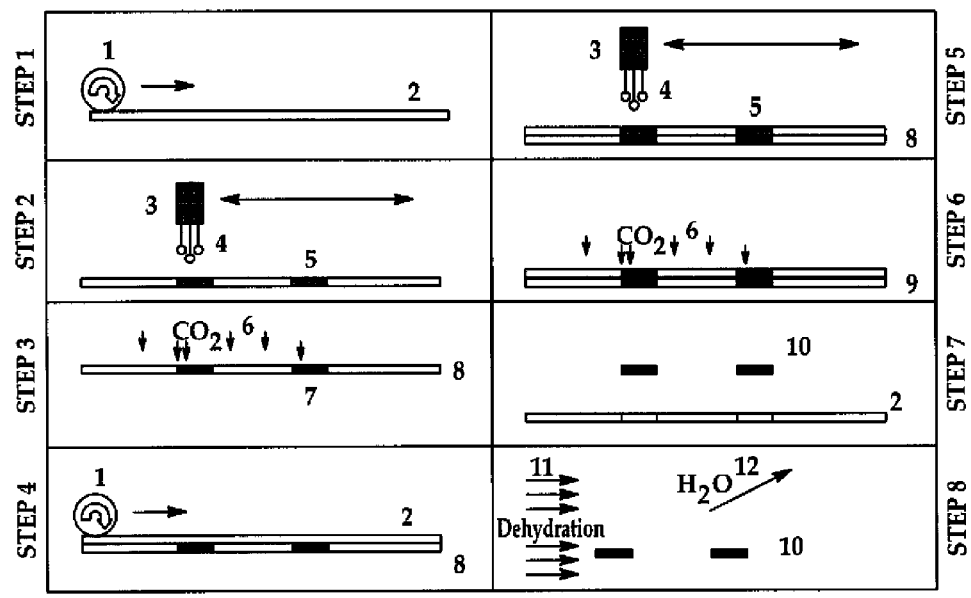
FIG. 8A is a stepwise description of one embodiment of a powder 3D printing method with rapid curing.

Referring to FIG. 8A, a stepwise description of one embodiment of a powder 3D printing method with rapid curing is shown. At Step 1, a roller (1) is utilized to roll out a thin layer of fresh powder (2) from a supply reservoir. After being rolled to a predefined thickness, an inkjet printer head (3) supplies an aqueous binder (4) onto the fresh powder bed (2) leaving behind partially hydrated powder (5) in a pre-defined cross sectional patterned from the process software, at Step 2. After hydration, $CO_2$ (6) supplied in the head space above the hydrated powder (5) is able to react to produce a partially solidified hydrated layer (8), at Step 3. The process then repeats at Step 4, by rolling out (1) a new layer of powder (2) on top of the partially solidified hydrated layer (8). The print head (3) then places another predefined pattern of solution on top of the fresh powder (2), which is able to also partially hydrate the previous layer (8), at Step 5. Again, $CO_2$ (6) supplied in the head space is able to react to form a solidified powder (7) that is intimately connected to the previous layer (8), at Step 6. The process can be repeated as necessary to complete the 3D part. After the desired shape is created, the shape (10) can be removed in a partially-hardened condition from the left over non-hydrated powder (2), at Step 7. The part (10) can then be dehydrated (11) utilizing microwave, convective or vacuum assistance for moisture removal (12), at Step 8. The non-hydrated powder (2) can then be recycled for the next print.

Figure 9:
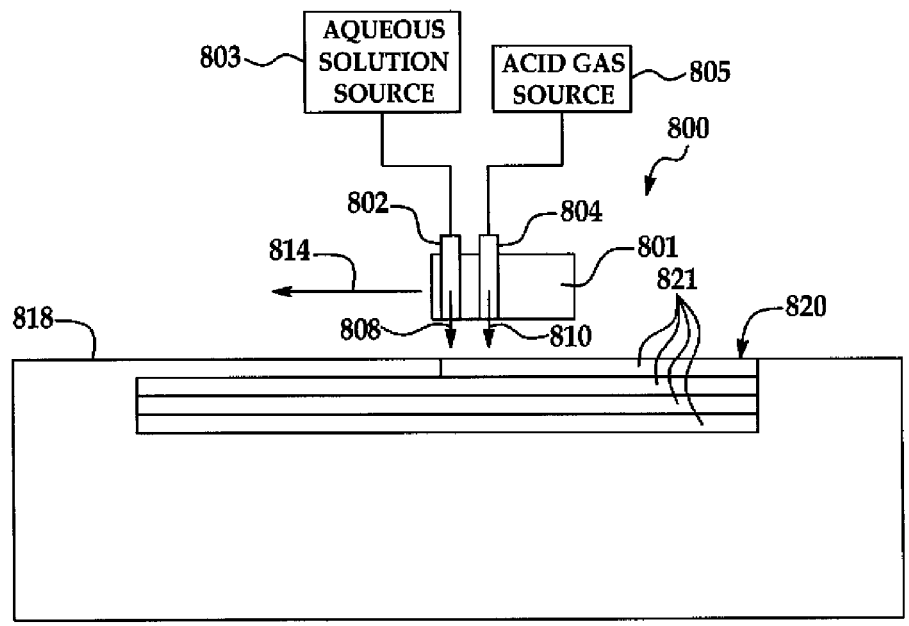
FIG. 9 is a schematic diagram of a powder curing system in implementation of an illustrative embodiment of a method of fabricating a three-dimensional printed part.

Referring next to FIG. 9, a powder curing system 800 which is suitable for implementation of an illustrative embodiment of the method of forming a tooling structure is shown. The powder curing system 800 may include a three-dimensional print head 801 which is movable along a print head direction of movement 814. The print head 801 may be a piezoelectric print head which is part of a conventional three-dimensional printer. Accordingly, the print head 801 may be adapted to be driven by CAD data in the conventional manner. The print head 801 may include an aqueous solution injection nozzle 802 and an acid gas injection nozzle 804. Relative to the print head direction of movement 814, the acid gas injection nozzle 804 may be positioned immediately adjacent to and behind the aqueous solution injection nozzle 802.

An aqueous solution source 803 may be disposed in fluid communication with the aqueous solution injection nozzle 802. The aqueous solution source 803 may contain a supply of aqueous solution 808. In some embodiments, the aqueous solution 808 may be water. In some embodiments, the aqueous solution 808 may include water in addition to organic or inorganic fluid binder ingredients. At least one of the organic binder and the inorganic binder may be microwave-curable. The fluid binder ingredients may be present in the aqueous solution 808 in a quantity of from about 10% to about 40% by volume. As will be hereinafter described, the aqueous solution injection nozzle 802 may be adapted to dispense the aqueous solution 808 from the aqueous solution source 803 onto a powder bed 818 beneath the print head 801 as the print head 801 is moved along the print head direction of movement 814.

An acid gas source 805 may be disposed in fluid communication with the acid gas injection nozzle 804. The acid gas source 805 may contain a supply of acid gas 810. The acid gas 810 may be any chemically active gas which forms an acid upon contact of the acid gas 810 with the aqueous solution 808. In some embodiments, the acid gas 810 may be carbon dioxide ($CO_2$). As will be hereinafter described, the acid gas injection nozzle 804 may be adapted to dispense the acid gas 810 from the acid gas source 805 onto the powder bed 818 immediately after the aqueous solution 808 is dispensed onto the powder bed 818 as the print head 801 is moved along the print head direction of movement 814.

The powder bed 818 may include an inorganic aggregate powder with a preferential composition of primarily Alumina ($Al_2O_3$) and Silicon (Si) with a mean particle size of between 20 and 150 microns, preferably between 30 and 50 microns, and more preferably about 40 microns. The volume fraction of the final powder may range from about 50% to about 99% and a mean, maximum particle aspect ratio of less than 3:1.

The powder bed 818 may further include a powdered dehydrated binder constituent that is soluble in polar solvents, including polyvinylpyrollidone and sodium or potassium silicate. The binder material may include from about 1% to about 10% by weight polyvinylpyrollidone and from about 1% to about 30% by weight sodium silicate ($NaSi\,O_3$), with a mean particle size of between about 20 and 150 microns, preferably between 30 and 50 microns, and more preferably about 40 microns.

The powder bed 818 may further include additives that enhance thermal conductivity, electrical conductivity and/or mechanical strength. Such additives may include but are not limited to carbon, silicon or metal oxide derived materials in powder or fibrous form, and may range from about 0.1% to about 25% by weight.

In exemplary implementation, the powder curing system 800 may be operated to fabricate one or more cured powder layers 821 in a powder bed 818. The cured powder layers 821 may serve as a water soluble tooling material for high temperature and pressure autoclave molding cycles. The method of operating the powder curing system 800 may facilitate the manufacture of tooling directly from CAD data via three-dimensional printing printers. This expedient may significantly decrease tooling manufacturing lead time. The method may also facilitate production of parts that would otherwise be too geometrically complicated to fabricate using molded mandrels or other soluble tooling details.

According to the method, CAD data may direct operation of the print head 801 in three-dimensional fabrication of a tooling structure 820 having at least one cured powder layer 821. The CAD data may define the three-dimensional configuration of the tooling structure 820 and direct operation of the print head 801 to cure the powder layer or layers 821 in the powder bed 818 accordingly. The print head 801 may initially be placed over one end of the powder bed 818. As the print head 801 is moved over the powder bed 818 along the print head direction of movement 814, the aqueous solution injection nozzle 802 and the acid gas injection nozzle 804 may be operated according to the CAD data to dispense aqueous solution 808 and acid gas 810, respectively, onto the powder bed 818. The aqueous solution injection nozzle 802 may deposit the aqueous solution 808 on the powder bed 818, immediately after which the acid gas injection nozzle 804 may deposit the acid gas 810 on the wetted powder bed 818. In some embodiments, the distance between the aqueous solution injection nozzle 802 and the acid gas injection nozzle 804 on the print head 801, and the speed of the print head 801 along the print head direction of movement 814, may be selected such that the acid gas 810 is deposited on the wetted powder bed 818 about 0.01~10 seconds, and preferably about 0.5 seconds, after the aqueous solution 808 is deposited on the dry powder bed 818.

Upon contact of the aqueous solution 808 with the powder bed 818, the aqueous solution 808 may dissolve the active components of the powder system, which may include particulate adhesive material and/or rapid solidification binder. The rapid solidification binder may be a silicate-based binder or may be any inorganic or organic binder that can be quickly initiated by the acid gas 810 which is dispensed from the print head 801. The wetting action of the aqueous solution 808 on the powder bed 818 may convert the once-dry powder into a hydrated binder in contact with the aggregate and fillers and the layers of the powder bed 818 below the wetted layer.

The acid gas 810 which the acid gas injection nozzle 804 deposits on the wetted powder bed 818 may instantly react with the hydrated silicate. Consequently, a cured powder layer 821 may be formed in the powder bed 818. In some embodiments, the print head 801 may be operated to repeat the foregoing process to form a rigid or semi-rigid, multi-layered cured tooling structure 820 having multiple adjacent cured powder layers 821. The cured tooling structure 820 may have a three-dimensional structure dictated by the CAD data which directs operation of the print head 801.

Each cured powder layer material 821 in the cured tooling structure 820 may have a coefficient of thermal expansion between the range of $0.5$–$9.0 \times 10^{-6}$ mm/mm/° C.; a specific gravity of between about 0.26 and 2.6; and an ultimate compressive strength at 22° C. of no less than 0.25 MPa with a preferential value greater than or equal to 1.4 MPa. The cured powder layer material 821 may be capable of forming mandrels, molds, cores or other tooling elements in highly complex geometries. The cured powder layer material 821 may be capable of exposure to autoclave conditions in excess of 185° C. and 0.75 MPa without substantial deformation or mechanical failure.

Figure 10:
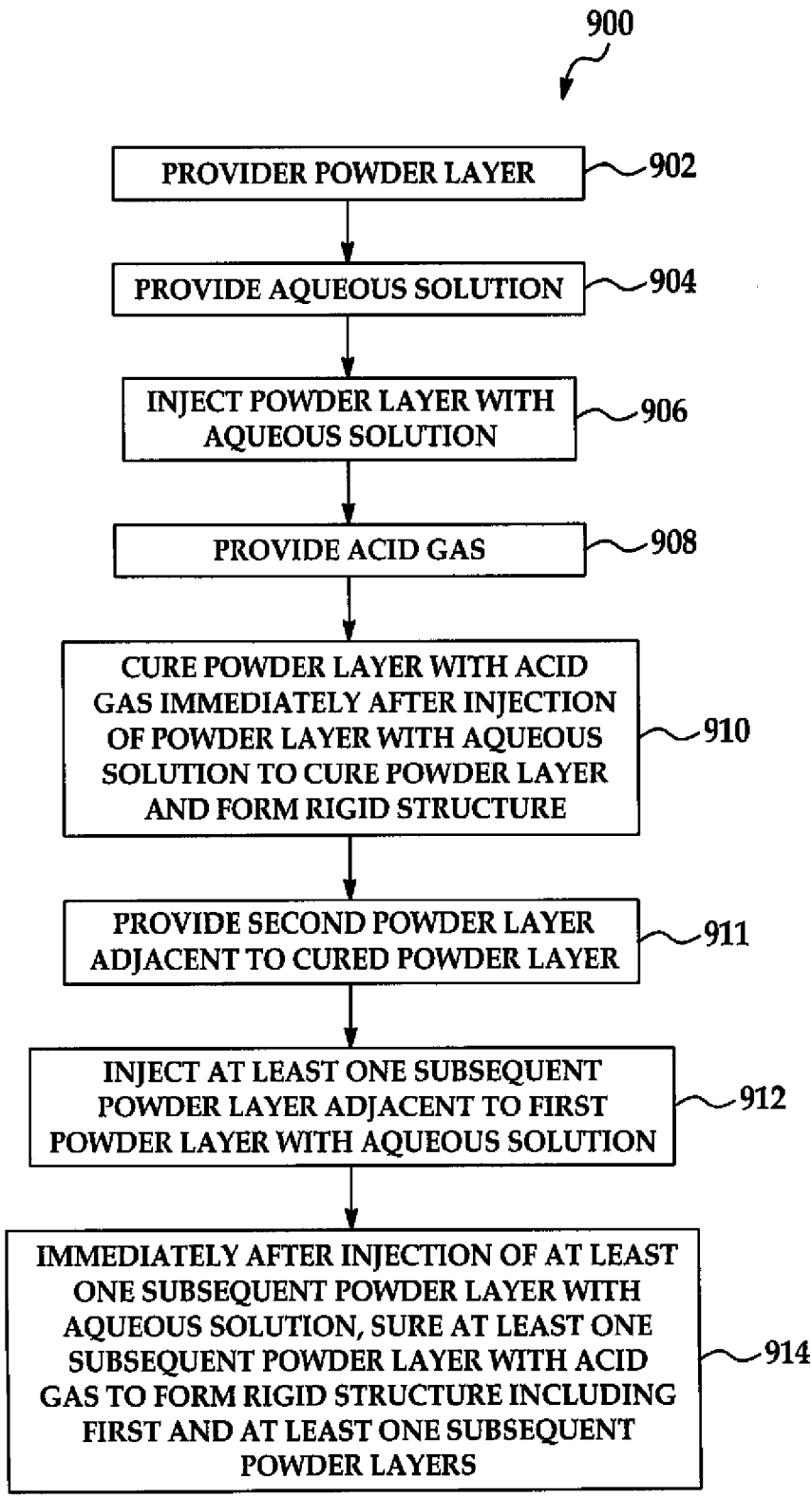
FIG. 10 is a flow diagram of an illustrative embodiment of a method of fabricating a three-dimensional printed part.

Referring next to FIG. 10 in conjunction with FIG. 9, a flow diagram 900 of an illustrative method of fabricating a three-dimensional printed part is shown. In block 902, a powder layer 818 is provided. The powder layer 818 may include an inorganic aggregate powder with a preferential composition of primarily Alumina ($Al_2O_3$) and Silicon (Si) with a mean particle size of between 20 and 150 microns, preferably between 30 and 50 microns, and more preferably about 40 microns. The volume fraction of the final powder in the powder layer 818 may range from about 50% to about 99% and a mean, maximum particle aspect ratio of less than 3:1.

The powder layer 818 may further include a powdered dehydrated binder constituent that is soluble in polar solvents, including polyvinylpyrollidone and sodium or potassium silicate. The binder material may include from about 1% to about 10% by weight polyvinylpyrollidone and from about 1% to about 30% by weight sodium silicate ($NaSi\,O_3$), with a mean particle size of between about 20 and 150 microns, preferably about 40 microns.

The powder layer 818 may further include additives that enhance thermal conductivity, electrical conductivity and/or mechanical strength. Such additives may include but are not limited to carbon, silicon or metal oxide derived materials in powder or fibrous form, and may range from about 0.1% to about 25% by weight.

In block 904, an aqueous solution 808 may be provided. In some embodiments, the aqueous solution 808 may be water. In some embodiments, the aqueous solution 808 may include water in addition to organic or inorganic fluid binder ingredients. At least one of the organic binder and the inorganic binder may be microwave-curable. The fluid binder ingredients may be present in the aqueous solution 808 in a quantity of from about 10% to about 40% by volume.

In block 906, the powder layer 818 may be injected with the aqueous solution 808. In some embodiments, the aqueous solution 808 may be injected onto the powder layer 818 using a three-dimensional print head 801.

In block 908, an acid gas 810 may be provided. The acid gas 810 may be any chemically active gas which forms an acid upon contact of the acid gas with the aqueous solution 808. In some embodiments, the acid gas 810 may include carbon dioxide ($CO_2$).

In block 910, the wetted powder layer 818 may be cured with the acid gas 810 immediately after injection of the wetted powder layer 818 with the aqueous solution 808 to cure the powder layer 818 and form a rigid structure 820 with cured powder layers 821. In some embodiments, the wetted powder layer 818 may be cured with the acid gas 810 by depositing the acid gas 810 on the wetted powder layer 818 about 0.01~10 seconds, and preferably about 0.5 seconds, after the aqueous solution 808 is deposited on the dry powder bed 818. In some embodiments, the acid gas 810 may be deposited onto the wetted powder layer 818 using a three-dimensional print head 801.

In block 911, a second powder layer may be applied adjacent to the cured powder layer. In some embodiments, the second powder layer may be applied on top of the cured powder layer.

In block 912, at least one subsequent powder layer 818 adjacent to the first powder layer 818 may be injected with the aqueous solution 808. In block 914, immediately after injection of the at least one subsequent powder layer 818 with aqueous solution, the subsequent powder layer or layers may be cured with acid gas to form a rigid or semi-rigid structure 820 which includes the first cured powder layer 821 and subsequent cured powder layer or layers 821.

Figure 11:
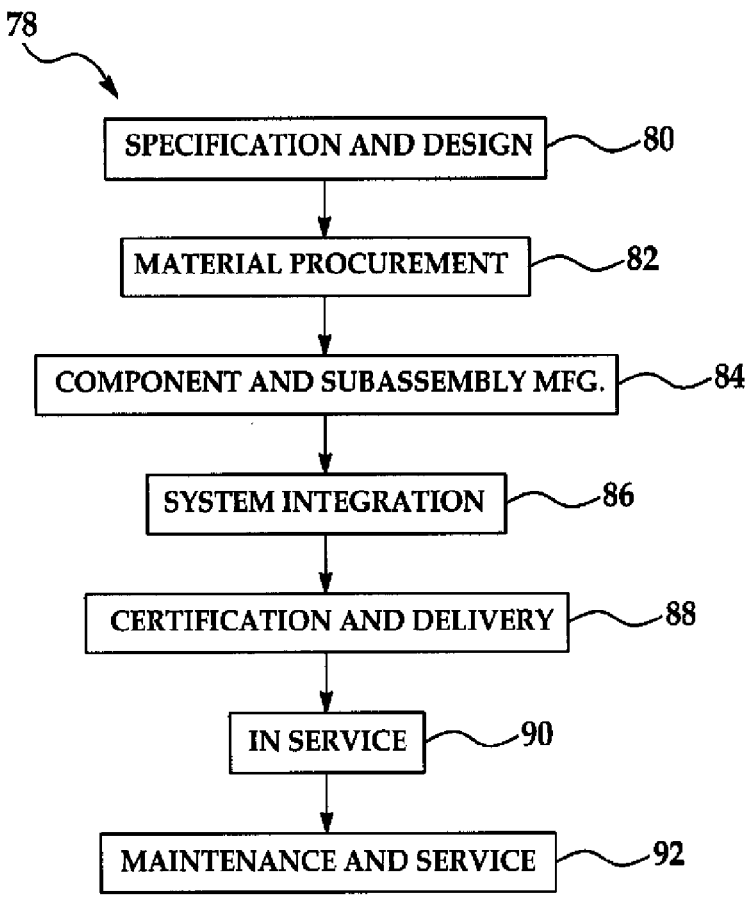
FIG. 11 is a flow diagram of an aircraft production and service methodology.
Figure 12:
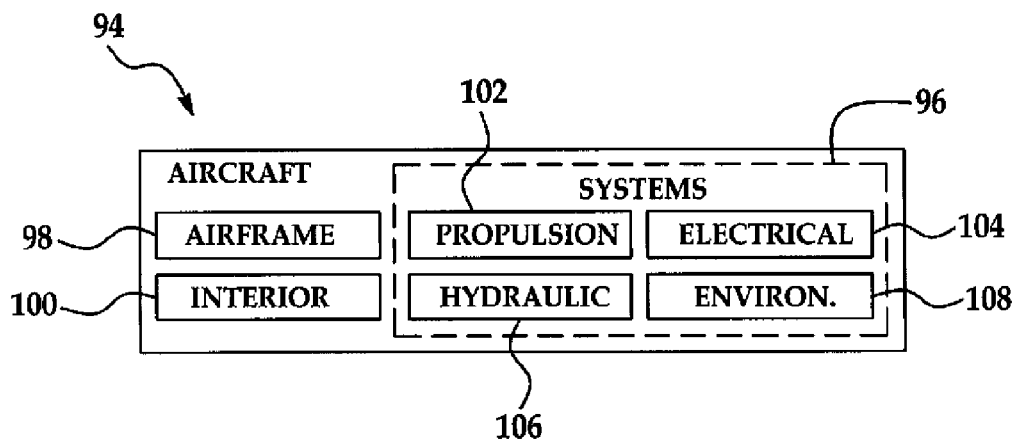
FIG. 12 is a block diagram of an aircraft.

Referring next to FIGS. 11 and 12, embodiments of the disclosure may be used in the context of an aircraft manufacturing and service method 78 as shown in FIG. 11 and an aircraft 94 as shown in FIG. 12. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a three-dimensional printed part, comprising:
    injecting an aqueous solution including water and a fluid binder from a three-dimensional printer head onto a first powder layer comprising alumina and silicon powder particles with a mean particle size between about 20 microns and about 150 microns, and a dry water-soluble binder including from about 1% to about 10% by weight polyvinylpyrrolidone and from about 1% to about 30% by weight sodium silicate mixed with the powder particles;
    curing the first powder layer by depositing carbon dioxide on the first powder layer to form a rigid structure between 0.1 and 10 seconds after injecting the powder layer with the aqueous solution.

2. The method of claim 1 wherein curing the first powder layer comprises depositing the carbon dioxide on the first powder layer about 0.5 seconds after injecting the first powder layer with the aqueous solution.

3. The method of claim 1 wherein the first powder layer has a mean particle aspect ratio of 3:1.

4. The method of claim 1 wherein the first powder layer comprises powder particles in a volume fraction of from about 50% to about 90%.

5. The method of claim 1 wherein the first powder layer comprises additives including carbon, silicon or metal oxide derived materials in a quantity of from about 0.1% to about 25% by weight.

6. The method of claim 1, further comprising injecting at least one subsequent powder layer comprising alumina and silicon powder particles with a mean particle size between about 20 microns and about 150 microns, and a dry water-soluble binder including from about 1% to about 10% by weight polyvinylpyrrolidone and from about 1% to about 30% by weight sodium silicate mixed with the powder particles adjacent to the first powder layer with aqueous solution including water and a fluid binder.

7. The method of claim 6, further comprising curing the at least one subsequent powder layer by depositing carbon dioxide on the at least one subsequent powder layer to form a rigid structure comprising the first powder layer and the at least one subsequent powder layer.

8. The method of claim 7 wherein curing the at least one subsequent powder layer comprises depositing the carbon dioxide on the first powder layer about 0.5 seconds after injecting the at least one subsequent with the aqueous solution.

9. The method of claim 6, wherein the at least one subsequent powder layer comprises a mean particle aspect ratio of 3:1.

10. The method of claim 6, wherein the at least one subsequent powder layer comprises powder particles in a volume fraction of from about 50% to about 90%.

11. A method, comprising:
  injecting an aqueous solution including water and a fluid binder onto a first powder layer comprising aggregate particles and a dry water-soluble binder including polyvinylpyrrolidone and at least one of sodium silicate or potassium silicate mixed with the aggregate particles; and
  curing the first powder layer by depositing an acid gas on the first powder layer.

12. A method as defined in claim 11, wherein the fluid binder comprises a microwave-curable inorganic binder material.

13. A method as defined in claim 11, wherein the first powder layer comprises between about 1% to about 10% by weight of polyvinylpyrrolidone.

14. A method as defined in claim 11, wherein the first powder layer comprises between about 1% to 30% by weight of sodium silicate.

15. A method, comprising:
  injecting an aqueous solution onto a first powder layer comprising a powdered dehydrated binder constituent that is soluble in a polar solvent;
  curing the first powder layer by depositing an acid gas on the first powder layer;
  applying a second powder layer comprising the powdered dehydrated binder constituent;
  injecting the aqueous solution onto the second powder layer such that the first powder layer is at least partially hydrated; and
  curing the second powder layer by depositing the acid gas onto the second powder layer after injecting the first powder layer with the aqueous solution, curing the second powder layer to form a rigid structure comprising the first and second powder layers.

16. The method of claim 15, wherein curing the second powder layer causes the rigid structure to have a coefficient of thermal expansion between about $0.5 \times 10^{-6}$ millimeters per millimeter per degree Celsius to about $9.0 \times 10^{-6}$ millimeters per millimeter per degree Celsius.

17. The method of claim 15, wherein curing the second powder layer causes the rigid structure to have a specific gravity of between about 0.26 and 2.6.

18. The method of claim 15, wherein curing the second powder layer causes the rigid structure to have an ultimate compressive strength of at least 0.25 megapascals at 22 degrees Celsius.

* * * * *